(12) United States Patent
Knittel

(10) Patent No.: US 7,525,706 B2
(45) Date of Patent: Apr. 28, 2009

(54) DATA PAGE PIXEL SHAPING FOR HOLOGRAPHIC RECORDING

(75) Inventor: Joachim Knittel, Tuttlingen (DE)

(73) Assignee: Thomson Licensing, Boulogne-Billancourt (FR)

( * ) Notice: Subject to any disclaimer, the term of this patent is extended or adjusted under 35 U.S.C. 154(b) by 211 days.

(21) Appl. No.: 11/364,626

(22) Filed: Feb. 28, 2006

(65) Prior Publication Data
US 2006/0203316 A1    Sep. 14, 2006

(30) Foreign Application Priority Data
Mar. 14, 2005    (EP) ................... 05101965

(51) Int. Cl.
    *G03H 1/00*     (2006.01)
(52) U.S. Cl. .......................... 359/30; 359/35
(58) Field of Classification Search .................. None
See application file for complete search history.

(56) References Cited

U.S. PATENT DOCUMENTS

| | | | |
|---|---|---|---|
| 5,694,488 A | 12/1997 | Hartmann et al. | |
| 2002/0075776 A1 | 6/2002 | Kasazumi et al. | |
| 2003/0128324 A1 | 7/2003 | Woods et al. | |

FOREIGN PATENT DOCUMENTS

| EP | 0458463 | 11/1991 |
|---|---|---|
| EP | 1526519 | 4/2005 |

OTHER PUBLICATIONS

Shin'ichi Nakatsuka, Akira Arimoto, Seiji Maruo, Shinya Kobayashi: "Resolution enhancement printing with a variable spot size laser diode" Applied Optics, vol. 36, No. 24, Aug. 20, 1997, pp. 5866-5880.
Wenhai Liu, Demetri Psaltis: "Pixel size limit in holographic memories" Optics Letters, vol. 24, No. 19, Oct. 1, 1999, pp. 1341-1342.
Sergei S. Orlov, William Phillips, Eric Bjornson, Yuzuru Takashima, et al.,: "High transfer-rate high-capacity holographic disk dat-storage system" Applied Optics, vol. 43, No. 25, Sep. 1, 2004, pp. 4902-4914.
Search report dated Aug. 8, 2005.

*Primary Examiner*—Stephone B. Allen
*Assistant Examiner*—Derek S Chapel
(74) *Attorney, Agent, or Firm*—Robert D. Shedd; Robert B. Levy; Jorge Tony Villaboo

(57) ABSTRACT

The shaping of pixels of a data page for holographic recording, a holographic recording medium including data pages with shaped pixels, and apparatuses for writing to or reading from such holographic recording media are disclosed.

A device for modulating a light beam to generate a data page having a plurality of pixels applies a spatially varying pixel size over the data page. An apparatus for writing to holographic recording media includes such a device for modulating a light beam, while an apparatus for reading from holographic recording media includes an adapted detector for detecting the data page having a plurality of pixels with a spatially varying pixel size.

6 Claims, 2 Drawing Sheets

DATA PAGE PIXEL SHAPING FOR HOLOGRAPHIC RECORDING

This application claims the benefit, under 35 U.S.C. § 119 of French Patent Application 05/101965, filed Mar. 14, 2005.

FIELD OF THE INVENTION

The invention relates to the shaping of pixels of a data page for holographic recording, to a holographic recording medium including data pages with shaped pixels, and to apparatuses for writing to or reading from such holographic recording media.

BACKGROUND OF THE INVENTION

Since the invention of digital holographic data storage technology it is a superior objective to increase the storage capacity within a recording medium, or to minimize the size of the recording medium for a certain quantity of information, respectively. The information is recorded in form of volumetric interference patterns inside the volume of the recording medium. In the technology of digital holographic storage, the information is arranged in the form of binary data pages, which is usually realized by a modulation of a laser beam using a spatial light modulator (SLM), i.e. an array of light modulating pixels. This laser beam is systematically scanned over the surface of the recording medium, e.g. a rotating holographic disk having a recording layer, or a holographic storage card. The increase of the storage density up to 100 bits/µm$^2$ is due to the use of the third dimension, i.e. not only a plane surface is used for carrying the information, but a volume in the recording layer. As indicated before the data are arranged in the form of data pages containing a plurality of bits, e.g. 100 or more bits. Recovered data pages are usually analyzed using a CCD array having the same number of pixels as the SLM. Due to the high parallelism of data readout, high data transfer rates of up to 10 Gbits/s and more are achievable.

One problem encountered in holographic recording systems is cross talk from adjacent recorded holograms. The suppression of cross talk between different holograms depends on the field angle. Large cross talk leads to a low signal-to-noise ration (SNR). For example, the shift distance of shift-multiplexed holographic memory systems has to be selected according to the minimum signal to reference beam angle to avoid excessive cross-talk from the corresponding part of the data page. However, this leads to a loss in data density in other parts of the data page, as described by Steckmann et al., Appl. Opt. 40, 3387-3394 (2001). Another example for a position dependent SNR is given by Curtis et al., J. Opt. Soc. Am. A 10 2547-2550 (1993).

Orlov et al., Appl. Opt., 43, 4902-4914 (2004) describe the design and implementation of a high-data rate, high capacity digital holographic storage disk system. The data density per hologram is described as the ratio of the number of recorded data pixels divided by the storage location area. The data storage density is affected by different parameters of the system set up and the storing method. The most influencing parameters are the material of the storage medium itself, the material thickness of the storage medium, and the wavelength of the light beam, as smaller focus geometries are achievable for shorter wavelengths. Generally, for high data densities in a digital holographic storage system the amount of SLM-to-CCD pixel misdetection due to imaging distortions and aberrations has to be within very narrow boundaries, e.g. less than 0,2 pixel or better. This detection precision, along with a high numerical aperture (NA), puts stringent requirements on the quality of the imaging optics.

The imaging at large field angles, e.g. by objective systems with a high NA, is not as good as at small field angles. Consequently, the image is affected by optical aberrations, which increase with the increase of the field angle. This causes the SNR to depend on the field angle. This applies in particular for cheap optical components such as those used in current DVD players or recorders. From an economic point of view, it would be desirable to use similar plastic components also for holographic storage systems. As a result, the suppression of cross talk between different adjacent pixels on the CCD depends on the field angle. The pixel size has to be selected according to the maximum permissible cross talk, which is in general determined by the pixels with large field angle. However, this leads to a loss in data density in other parts of the data page. Therefore, the storage capacity of holographic storage systems is limited by the lowest SNR in the image plane.

US 2002/0075776, which is considered to constitute the closest prior art, discloses an apparatus for reading from and writing to holographic storage media, having a detector array with different detector pixel sizes. Pixel deformations are overcome by oversampling or by controlling the laser wavelength.

SUMMARY OF THE INVENTION

It is an object of the present invention to provide a device for improving the storage capacity of a holographic storage medium.

This object is achieved by a device for modulating a light beam to generate a data page having a plurality of pixels for recording on a holographic recording medium, wherein the pixels of the data page have a spatially varying pixel size over the data page.

The limitation of the storage density in holographic storage systems is given in particular by the pixel size in the border area of the data page. The aberrations in the optical elements within the objectives cause distortions in the optical field, and the SNR decreases in the image of the light beam in outer areas. Therefore, it is proposed to improve the storage capacity of holographic data storage systems by introducing a spatially varying data pixel size, which adapts the pixel size to the distortions at higher field angles. Thus, large data page pixels are used in regions where the SNR is low. The enlarged data page pixels increase the SNR, which results in less detector noise, and reduces cross talk between neighboring pixels due to optical aberrations, which also improves the SNR. Thus, the invention permits the use of simple optical components, because it is not longer required to build complex optical layouts in order to minimize distortions caused by aberrations. The varying of the pixel size can be carried out in an incremental form from the inner area to the outer area, or rather can feature two or more steps, whereas the pixel size increases from the inner area to the outer area in these steps. Favorably the spatially varying pixel size is realized by a spatial light modulator having a spatially varying pixel size and/or a beam shaping optics.

According to an advantageous embodiment, the beam shaping optics comprises at least two aspheric optical elements. The at least two aspheric optical elements can comprise a telescope-like arrangement of a pair of objective lenses, whereby the lenses may be convex, concave, plano-convex, biconvex or biconcave. The arrangement of two optical components can be built as small as permitted by the implementation in the optical path between the spatial light modulator and the writing objective unit or in the reading objective unit and the detector means, respectively.

As an advantageous embodiment, the beam shaping optics performs a field angle dependent magnification of the light beam. The aspheric curvature of the optical elements corresponds to the required magnification, depending on the distance to the center of the beam shaping optics, whereby the magnification effect increases according to greater distances to the optical axis.

Advantageously, the field angle dependent magnification by the beam shaping optics causes an essentially constant signal to noise ratio over the data page in the spatial light modulator and/or in the detector means. The storage capacity can be maximized, if the SNR within the entire data page corresponds to the SNR close to the center area of the data page, because in this region the SNR is at a maximum. This effect can be reached by an appropriate magnification of the pixel size in the outer regions, showing a higher distortion by aberration effects in the objective units. If the SNR is constant over the entire data page, the electronic processing of the data signal is easier, because the sampling of the signal has not to be adapted to the lowest SNR, whereby the storage density would be lower.

Advantageously, the varying pixel size causes a constant signal to noise ratio within the data page. A constant signal to noise ratio is achievable by an adaptation of the field angle dependent pixel size to the distortion in the light beam. In particular the readout of a recorded data page, carried out by the detector means, is performed with a higher reliability, if the SNR is constant over the entire data page and therewith not dependent on the lowest SNR in outer areas of the data page.

The spatial light modulator can for instance consist of a liquid crystal display (LCD), a micro mirror array or the like. Illumination of the SLM can be either transmissive, i.e. the light beam is modulated when it passes the SLM, or reflective, i.e. the light beam is modulated when it is reflected by the SLM. The light source for emitting the light beam advantageously is a laser source like a diode laser or similar. The detector means preferably is a charged coupled device (CCD) array.

It is a further object of the invention to propose a holographic recording medium having an improved storage capacity.

According to the invention, this object is achieved by a holographic recording medium including data arranged in the form of at least one data page having a plurality of pixels, wherein the pixels of the data page have a spatially varying pixel size over the data page.

It is another object of the present invention to propose an apparatus for writing to holographic recording media, which achieves an improved SNR over the entire data page and therefore a high storage density on the holographic recording medium.

The above object is achieved by apparatus for writing to holographic recording media including at least one light source for generating a light beam, a writing objective for focusing the light beam in at least one holographic recording medium to store a holographic image, and a device according to the invention for modulating the light beam to generate a data page having a plurality of pixels, wherein the pixels of the data page have a spatially varying pixel size over the data page.

It is still a further object of the invention to propose an apparatus for reading from a holographic recording medium according to the invention.

According to the invention, this object is achieved by an apparatus for reading from holographic recording media, including at least one light source for generating a light beam, a reading objective, and a detector means for detecting a data page having a plurality of pixels, wherein the detector means includes an array of pixels whose size increases towards the edge of the array.

The adaptation of the detector pixel matrix to the pixel size of the image in the outer regions within the data page leads to a high SNR over the entire data page. For this purpose the known standard detector having a uniform pixel matrix is replaced by a detector having a spatially varying pixel matrix, i.e. a varying pixel size. Such a detector achieves a high and essentially constant SNR over the whole data page when the data page is stored with a varying pixel size.

Alternatively, at least one beam shaping optics is placed in the optical axis in-between the reading objective and the detector means, in order to adapt a spatially varying pixel size of the recovered data page to the pixel size of the detector means. By employing an additional beam shaping optics, the apparatus can likewise operate with a high signal to noise ratio over the entire data page. The adaptation of the field angle dependent magnification causes a high SNR even when a conventional spatial light modulator and a conventional detecting means are used, respectively. The beam shaping optics may be based on a telescope principle, e.g. by using specific objective lenses featuring an aspheric diffraction surface in order to obtain a field angle dependent magnification. Therewith optical aberrations in the writing and/or reading objectives do not have any negative effects regarding the cross talk between neighboring pixels. The beam shaping optics is suitable to adapt the light beam distribution coming from the reading objective in such a way that it can consist of standard optical components, known from applications in CD- or DVD-players, whereas these optical components are bulk-produced and feature a simple construction and low accuracy constraints. Of course, the holographic system may include both a detector with a varying pixel size and a beam shaping optics in the reading path.

According to a further embodiment of the invention, the detector means has a high-resolution constant pixel size over the entire data page, such that the data page is over-sampled. In this case the data page bit pattern is preferably analyzed by software methods. This allows to use a standard detector array like a CCD-array having a constant pixel size, provided the resolution of the detector is higher than the resolution in the data page. With a suitable software method the recovered data page having a varying pixel size can be analyzed, because single pixels of the data page are detected by more than one pixel of the detector means. The software then calculates the true pixel configuration. Using this method, the SNR likewise increases, because the maximum SNR criterion is used as an optimization function.

BRIEF DESCRIPTION OF THE DRAWINGS

The foregoing and other aspects will become apparent from the following detailed description of the invention when considered in conjunction with the enclosed drawings.

DETAILED DESCRIPTION OF PREFERED EMBODIMENTS

Figure 1:
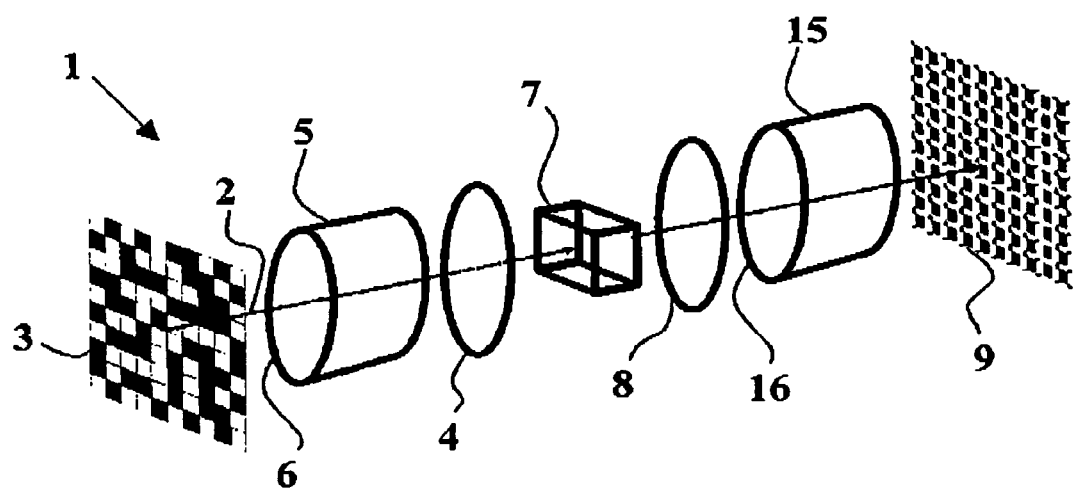
FIG. 1 shows an arrangement of an apparatus for reading from and writing to holographic recording media, whereas a pixel shaping optics is arranged in the entire optical path.

FIG. 1 shows an apparatus 1 for reading from and writing to holographic recording media in a perspective view. The apparatus 1 includes a light source, which is not shown in the drawing. The light source generates a light beam 2, which in this example is illuminated into the apparatus in a transmitting arrangement from the reverse side of a spatial light modulator 3. It is likewise possible to use a reflective arrangement for this purpose. The profile of the light beam 2 illuminating the spatial light modulator 3 undergoes a modulation by passing the spatial light modulator 3. In the figure the modulation is carried out as bright or dark pixels. Of course, other types of modulation can be used as well. Each single pixel represents a bit, and the whole field composes a data page. All components of the apparatus 1 are arranged on an optical axis.

A beam shaping optics 5 is arranged between a writing objective 4 and the spatial light modulator 3. In order to magnify the outer area of the beam profile for an adaptation of the pixel size of the data page impressed on the beam profile to the writing objective 4, the beam shaping optics 5 comprises two aspheric optical elements 6, which are configured as a telescope, featuring a higher magnification of the outer beam area, whereas the inner beam regions and accordingly the inner regions of the data page are not magnified. The adapted light beam 2 illuminates subsequently the writing objective 4, which focuses the light beam 2 into a recording medium 7. The recording medium 7 can be a holographic disk rotating under the light beam 2. Of course, the invention is likewise applicable to other types of recording media, e.g. holographic crystals. The light beam 2 carrying the data information in form of pixels crosses a reference beam (not shown here) inside the recording medium 7. The crossing of the signal light beam 2 and the reference beam within the material of the recording medium 7 leads to an interference pattern within the recording medium 7 and an interaction between this interference pattern and the material of the recording medium 7, whereby the data page is inscribed into the recording medium 7 in the form of this interference pattern.

For reading out the information inscribed into the recording medium 7, a reading objective 8 is illuminated by the light beam 2 after passing the recording medium 7. The light beam 2 carrying the recovered data page illuminates the reading objective 8, featuring the same beam profile with the same magnification in the outer area. The reading objective 8 collimates the light beam 2, which illuminates a detector means 9 after passing a beam shaping unit 15. The beam shaping unit 15 is applied in a reverse direction, in order to readjust the magnification of the outer areas of the light beam 2. The beam shaping unit 15 comprises two aspheric optical elements 16, which are configured as a telescope to compensate for the beam shaping done by the two aspheric optical elements 16 of the beam shaping unit 15. The readjusted light beam illuminates a CCD-array of the detector means 9, whereby the data can be read out by an appropriate sampling of the CCD-array. Of course, writing to and reading from a holographic recording medium 7 do not have to be performed by the same apparatus 1. It is likewise feasible to provide independent apparatuses for reading and for writing.

Figure 2:
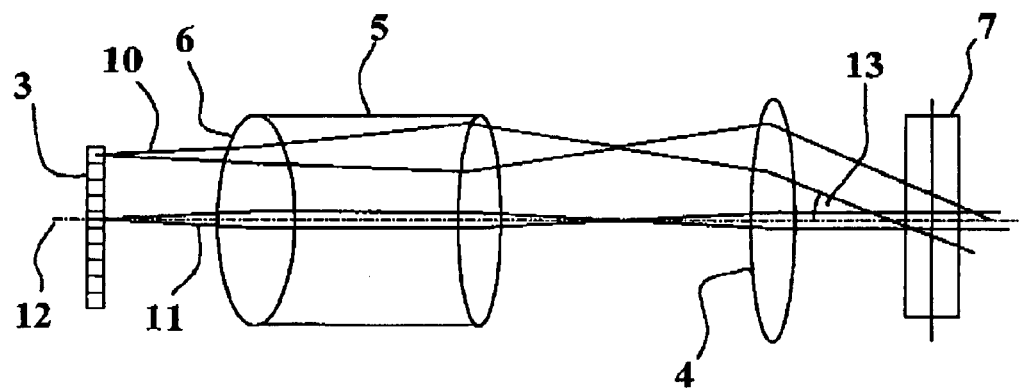
FIG. 2 shows the writing part of the apparatus according to FIG. 1, and in detail the optical path in the pixel shaping optics with a field angle dependent magnification.

FIG. 2 shows a more detailed view of the writing part of the apparatus 1 according to FIG. 1, featuring the beam shaping optics 5 in detail. Exemplary two beam portions are shown, an outer beam portion 10 and an inner beam portion 11. The light beam 2 propagates along the optical axis 12 and enters the beam shaping optics 5. The inner beam portion 11 is not affected by the beam shaping optics 5, but the outer beam portion 10 is magnified. The writing objective 4 is adapted to the extended diameter of the light beam 2. The focusing of the outer beam portion 10 is done under higher field angles 13.

Figure 3:
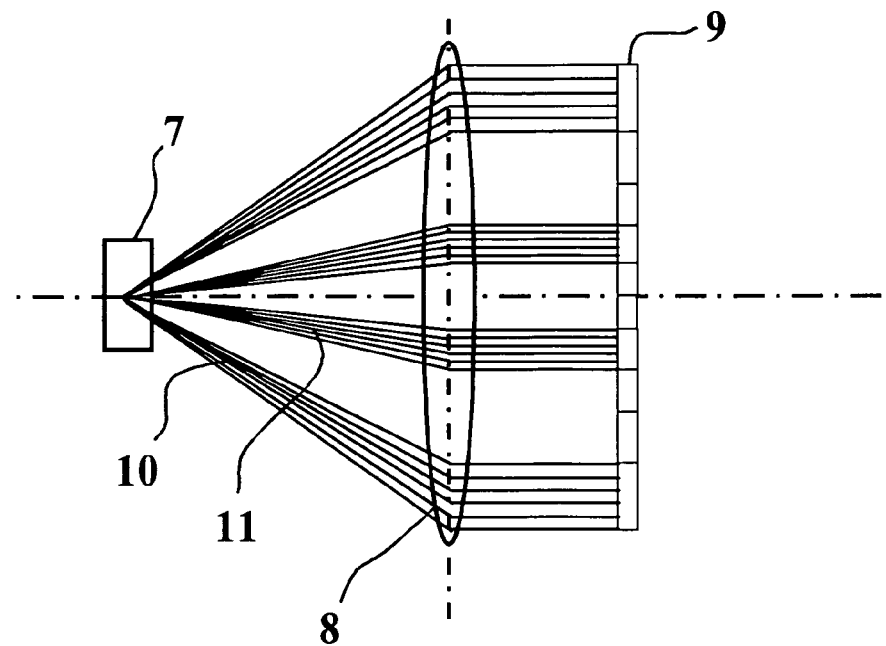
FIG. 3 shows a reading part of the apparatus with a detector means comprising a varying pixel size.

FIG. 3 shows an embodiment comprising a detector means 9 with a varying pixel size. A recording medium 7 is illuminated by a focused light beam in a transmissive arrangement. The light beam is then collimated by the reading objective 8 for illuminating the detector means 9. The detector means 9 features pixels with a varying pixel size, which gradually increases towards the outer area of the detector means 9. Smaller pixels are arranged in the inner area of the detector means 9, which are adapted to the smaller pixels of the data page of the inner beam portion 11, whereas in the outer area of the detector means 9 the pixel size is larger according to the larger pixels of the data page of the outer beam portion 10. With this arrangement, the read out system needs not to be adapted to the lowest SNR in the outer area of the detector means 9, as a large SNR is achieved in each area of the array, thus increasing the total storage capacity.

Figure 4:
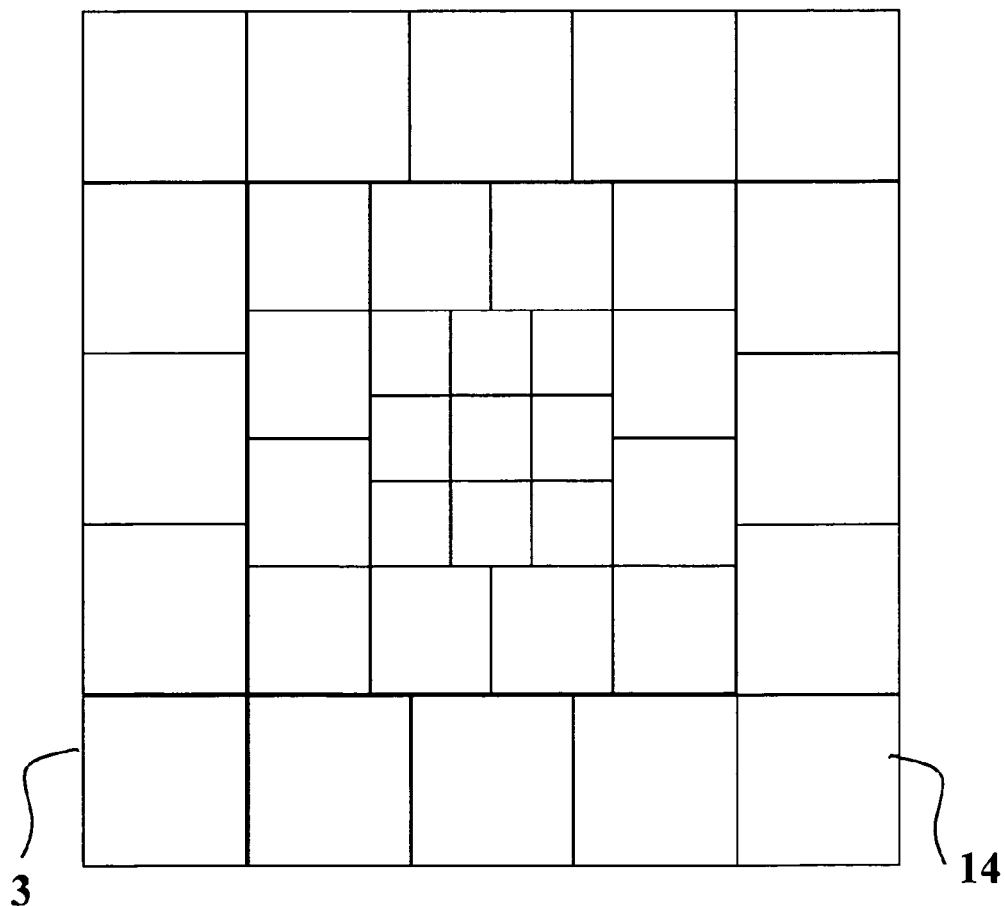
FIG. 4 depicts a spatial light modulator with a spatially varying pixel size.

As depicted in FIG. 4, it is likewise possible to use an SLM 3 with pixels 14 having a spatially varying pixel size instead of an SLM with constant pixel size in combination with a beam shaping optics 5. Similarly, a combination of an SLM 3 with a spatially varying pixel size and a beam shaping optics 5 can be employed. The spatially varying pixel size illustrated for the SLM can also be used for the detector means 9 shown in FIG. 1. In this case the beam shaping optics 5, which is necessary for a detector means 9 with constant pixel size, can be omitted.

The present invention is not limited by the embodiment described above, which is represented as an example only and can be modified in various ways within the scope of protection defined by the accompanying patent claims. Thus the invention is also applicable to different holographic systems.

Reference Numerals
1 apparatus
2 light beam
3 spatial light modulator
4 writing objective
5 beam shaping optics
6 optical element
7 recording medium
8 reading objective
9 detector means
10 outer beam portion
11 inner beam portion
12 optical axis
13 field angle
14 pixel
15 beam shaping unit
16 optical element

What is claimed is:
1. Device for modulating a light beam, comprising:
beam shaping optics for generating spatially varying pixel sizes over a data page having a plurality of pixels for recording on a holographic recording medium, the beam shaping optics located on an optical axis between a writing objective and a light beam modulating device in order to magnify an outer area of a profile of the light beam.

2. Device according to claim 1, wherein the beam shaping optics comprises at least two aspherical optical elements.

3. Device according to claim 1, wherein the beam shaping optics has a field angle dependent magnification of the light beam.

4. Device according to claim 1, wherein the spatially varying pixel size increases towards the border area of the data page.

5. Device according to claim 1, wherein the spatially varying pixel size varies such that the signal-to-noise ratio is essentially constant over the data page.

6. Apparatus for writing to holographic recording media, comprising:

at least one light source for generating a light beam, a writing objective for focusing the light beam in at least one recording medium to store a holographic image, a device for modulating the light beam to generate a data page having a plurality of pixels for recording on a holographic recording medium, and beam shaping optics for generating spatially varying pixel sizes over the data page, the beam shaping optics located on an optical axis between the writing objective and the light beam modulating device in order to magnify an outer area of a profile of the light beam.

* * * * *